July 16, 1957 D. A. POLZIN 2,799,124
CONVEYOR SYSTEM FOR PISTONS TO AND FROM GRINDING MACHINES
Filed June 10, 1955 4 Sheets-Sheet 1
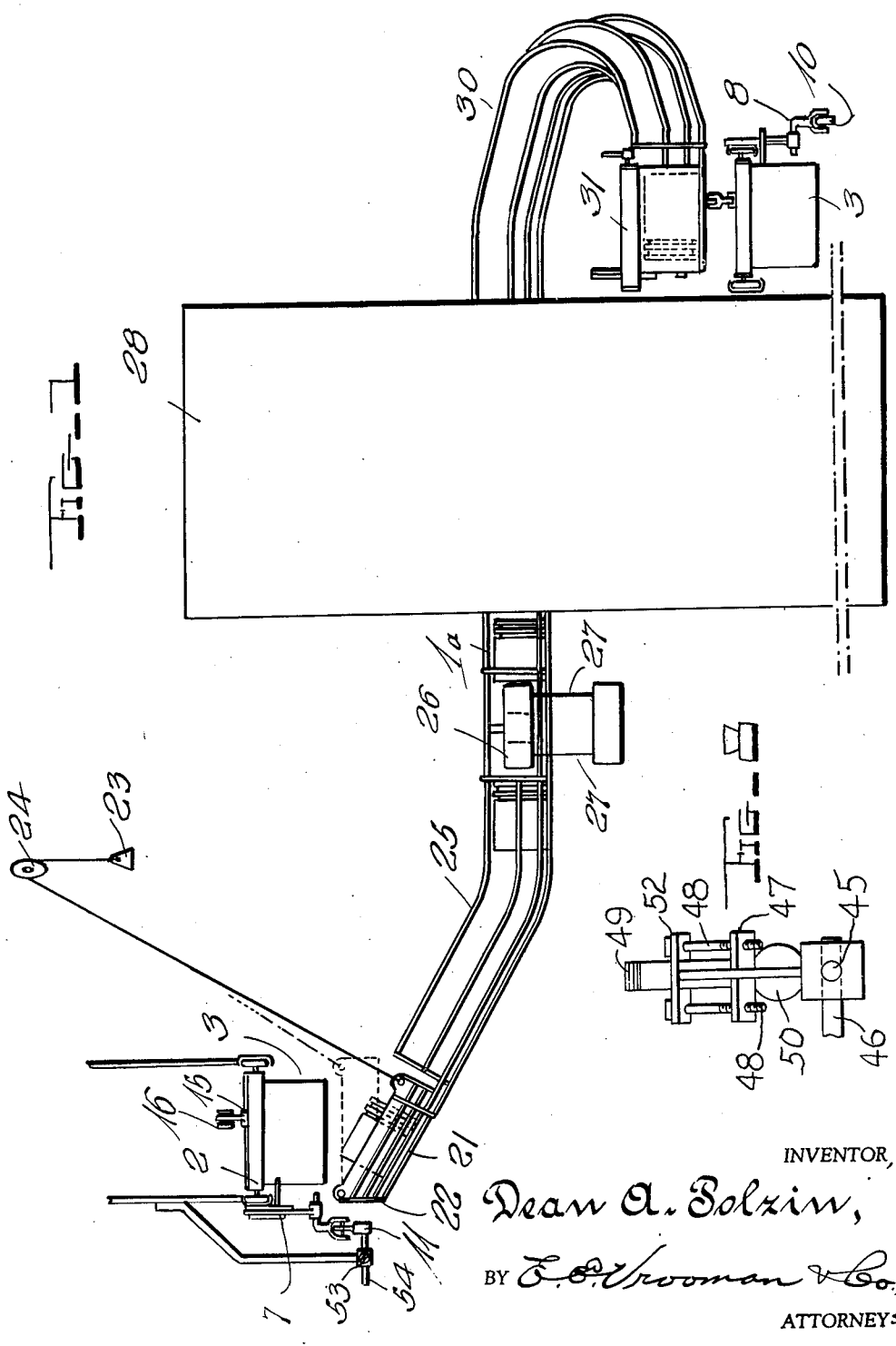
INVENTOR,
Dean A. Polzin,
BY Vrooman & Co.,
ATTORNEYS.

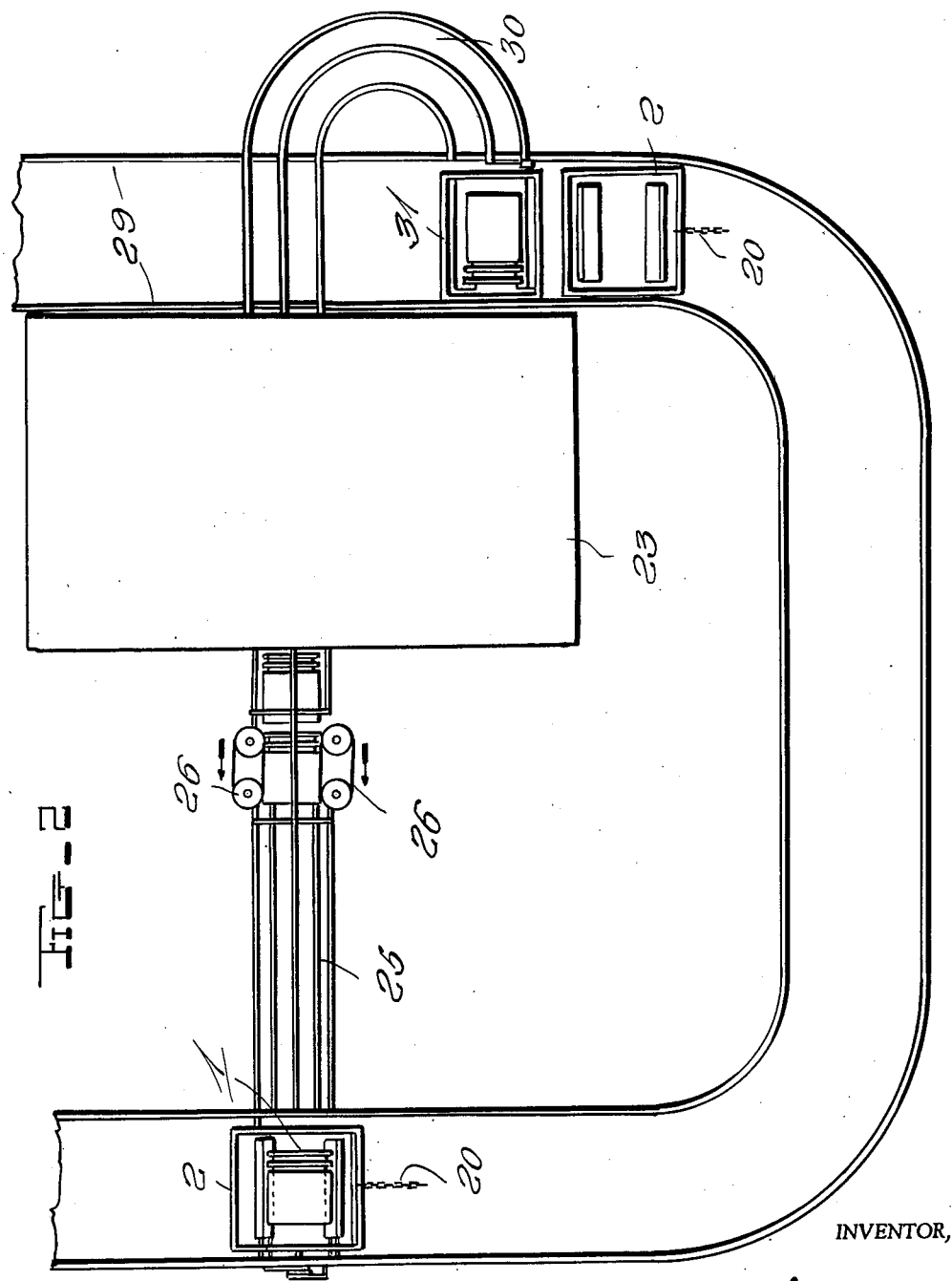

July 16, 1957
D. A. POLZIN
2,799,124
CONVEYOR SYSTEM FOR PISTONS TO AND FROM GRINDING MACHINES
Filed June 10, 1955
4 Sheets-Sheet 3
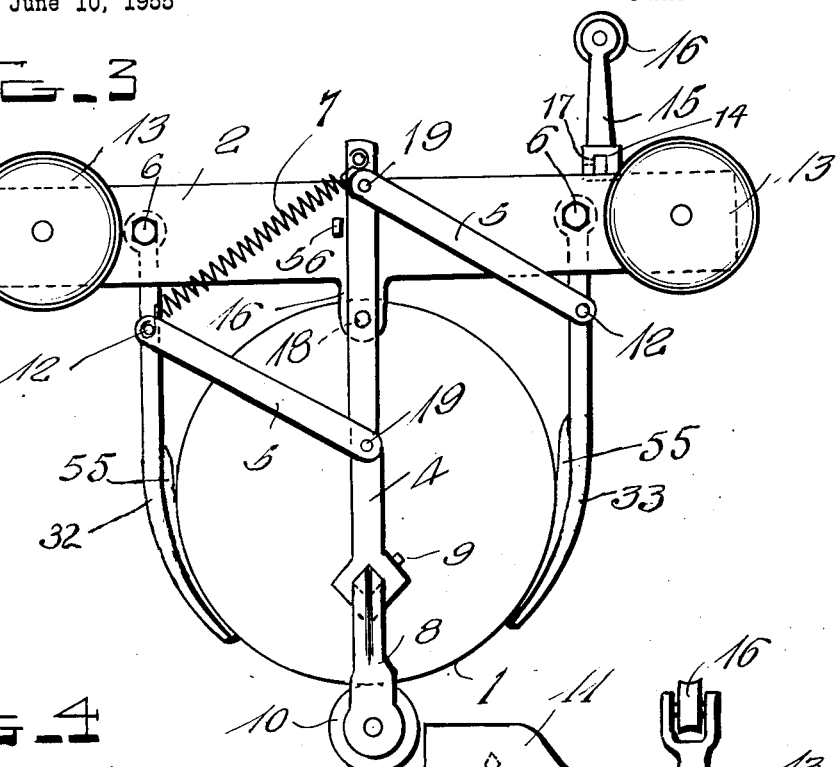
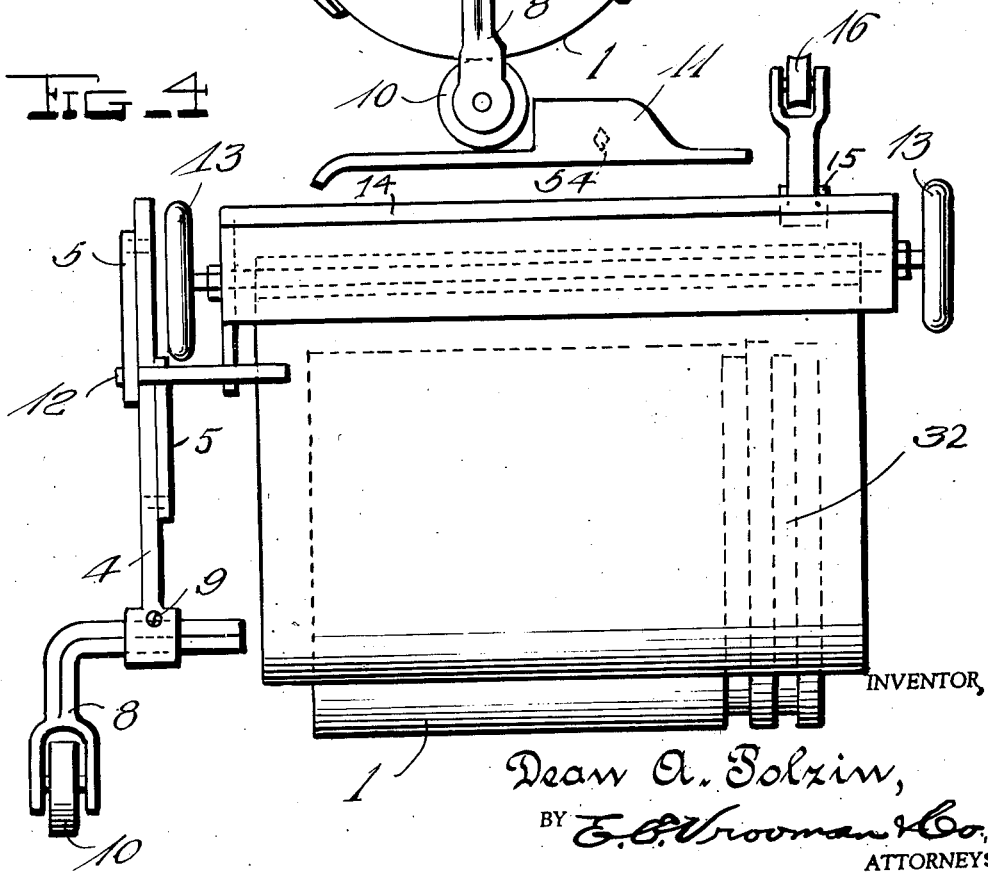
INVENTOR,
Dean A. Polzin,
BY E. P. Vrooman & Co.
ATTORNEYS

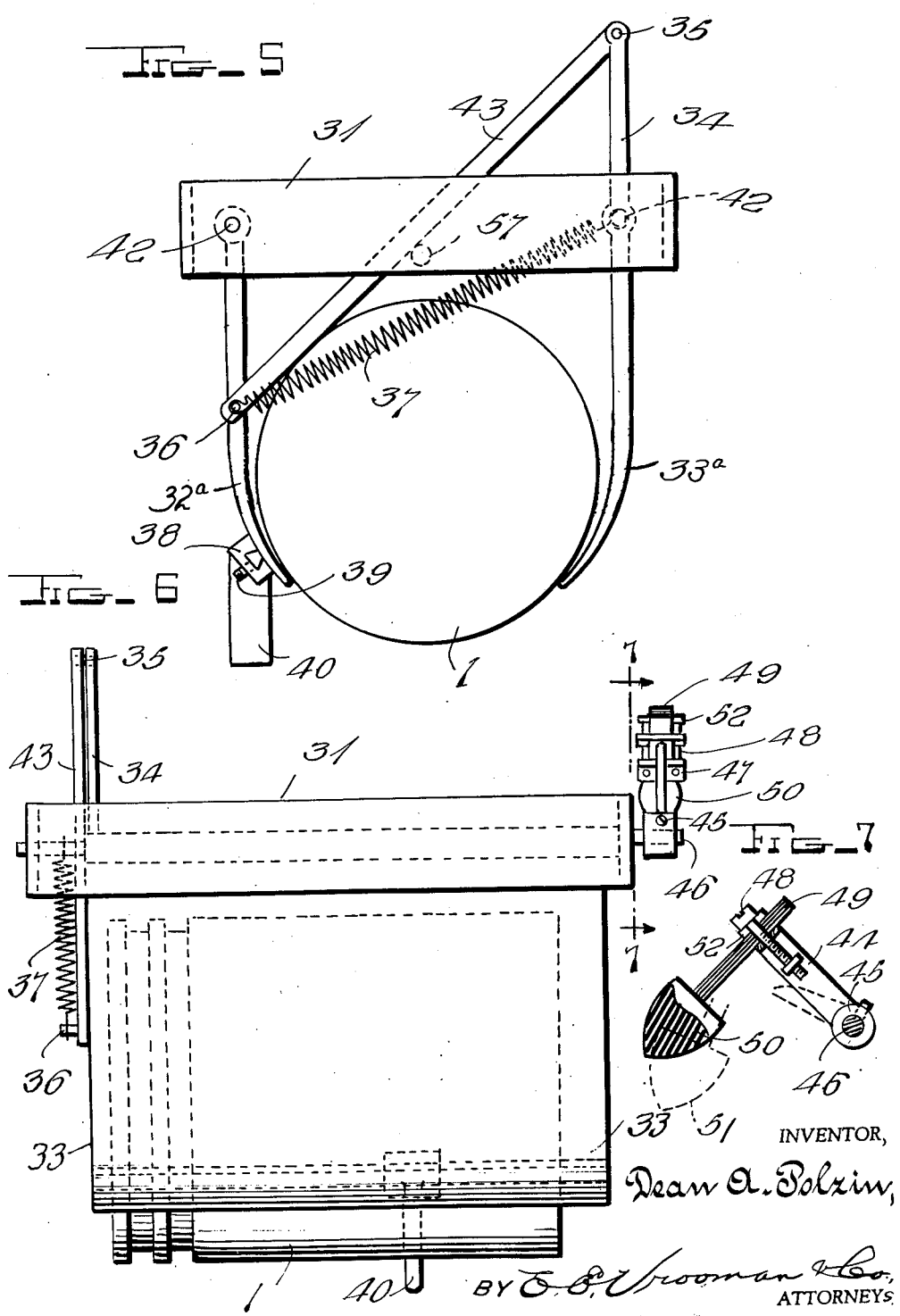

United States Patent Office 2,799,124
Patented July 16, 1957

2,799,124

CONVEYOR SYSTEM FOR PISTONS TO AND FROM GRINDING MACHINES

Dean A. Polzin, Angola, Ind.

Application June 10, 1955, Serial No. 514,614

1 Claim. (Cl. 51—74)

This invention for brevity is entitled a piston conveyor system.

This invention relates to a conveyor system which adapts conveyors to process pistons by means of a conveyor through a piston-grinding machine.

The machine for grinding the pistons is conventional, and an object of the invention resides in the method and means of conveying said pistons to the grinding machine, and from the machine after ejection therefrom.

Another object of the invention resides in the provision of means whereby pistons may be handled most expeditiously by means of a mechanical belt which conveys the finished piston from the piston-grinding machine onto a self sufficient shelf, which shelf delivers the piston to a bin whereby finished pistons, having passed through the machine, are deposited.

With the foregoing and other objects in view, this invention comprises certain novel constructions, combinations, and arrangements of parts as will behereinafter fully described, illustrated in the accompanying drawings, and more particularly pointed out in the appended claim.

In the drawings:

Fig. 1 is a side elevated view.

Fig. 2 is a top-plan view of the structure disclosed in Fig. 1.

Fig. 3 is a side-sectional view of the carrier unit, on a large scale taken substantially along the line 3—3 of Fig. 1, while Fig. 4 is a side-elevational view of the structure disclosed in Fig. 3.

Fig. 5 is a side-elevational view of portions of the piston holding unit.

Fig. 6 is a view showing part of the piston holding unit, while

Fig. 7 is a sectional view taken substantially along the line 7—7 of Fig. 6 on an enlarged scale.

Fig. 8 is an enlarged view of a constructional detail shown in Fig. 6.

Similar reference characters refer to similar parts throughout the several views of the invention.

The basic principle of the new conveyor is that it is made up of individual piston carrying units, these units being slaved to desired grinding machines by methods described below. A piston placed in one of the conveyor units is carried along until it contacts the chute of the grinder to which it is slaved. Each piston carrying unit carrier is then tripped, causing the piston to fall onto a chute leading into the grinder. The piston is passed through the grinder automatically as is now the case, and then passes into another chute leading from the grinder. At the end of this chute is a holding mechanism, which will be slaved to the conveyor units that are slaved to this machine. The empty conveyor units, having deposited their pistons at the front of the machine, now pass around to the rear holding device, trip it, and catch the finished pistons.

The piston carrying unit of the conveyor Figs. 3 and 4 is built upon a rigid rectangular metal frame 2 which serves as the mount for the device. The piston holding leaves 32 and 33, Fig. 3, are constructed with holes at their upper end through which bolts 6 may be inserted to act as a hinge. The bolts to be used in this way may be inserted through two holes in one side of the frame 2 and be turned into holes with threads provided at the opposite side of the frame.

Fig. 3 shows the downward extension of the center of 2 in order to provide a low pivot 18 for the trip rod 4. Attached to 4 by pivots 19 are two rods 5 which are attached by pivots 12 to the holding leaves 3. The lower end of 4 has a square hole through which an adjustable extension, Fig. 4, 8 may pass, to be held in place by set screw 9. Fig. 3 shows how coil spring 7 returns the holding leaves to the closed position, and is prevented from closing leaves unnecessarily far by a small metal projection 56 coacting with upper part of rod 4 as shown in Fig. 3.

Fig. 4 shows two of the four wheels 13 attached to the frame. These wheels fit into two grooved tracks Fig. 2 29, Fig. 4 gives a good view of the cross bar 14 to which the laterally adjustable trip wheel 16 is attached by means of a metal arm, Fig. 3, 15 and held in place by a set screw 17.

Fig. 1 has, on the upper left side, a view of the tripper 11 which actuates the piston carrying unit of the conveyor, and the chute onto which the piston falls and is carried into the grinder. The tripper 11 is mounted on a laterally adjustable rod 54 which fits through a hole in an arm attached to the suspended conveyor as shown, and held in place by a set screw 53. The piston is dropped onto a counterbalanced section 21 of the chute pivoted as at 22. Before the piston falls upon 21, 21 is held in the position indicated by the dotted line by means of a small weighted line 23 run over a pulley 24. The weight of the piston is sufficient to overcome the weight of 23, thereby forcing 21 to tilt down until stopped by two extended rods of chute 25. The angle of tilt will be sufficient to cause the piston to slide from 21 by gravity. As the piston must go into the grinder head first, there are two top rods, Fig. 2, 25, which serve to prevent the piston from flipping over when sliding off 21, at the moment that the weight of the piston remaining on 21 is overcome by the weight of 23.

Fig. 2 illustrates how the piston, prior to sliding into the grinder, is caught between two rotating belts on rotors 26. Drive shafts for the rotors are shown in Fig. 1, 27. The belts should be made of a flexible material with rubber lugs to provide grip and a cushion effect. The rotors nearest the grinder will be spaced a sufficient distance from the machine to allow one piston to rest between the rotors and the grinder. This enables the piston being forced through the rotors to push the forward piston into the grinders, and allows the forward piston to spin freely when in contact with the grinders. Rotors should not be far enough back from the grinder to allow two pistons to rest in the forward position, as it would be possible for the pistons to bind against each other, preventing them from going into the grinder. Figs. 5 and 6 show where the finished piston is held after sliding down the chute 30. Fig. 2. The frame 31 is similar in construction to that in Fig. 3, 2 being a rectangular metal bar to which the rest of the mechanism is attached. Leaf 33' has an extension arm 34, Fig. 5, to which is pivoted at 35 a bar 43, which is attached by a pivot 36 to the opposite leaf 32. Coil spring 37 holds leaves in closed position where they are prevented from closing too far by a small metal protrusion 57 inside the frame, which acts to keep 43 from being drawn farther than desired. The trip arm 40 is grooved to fit over the end of a slide bar 38 which is attached to 32, and may be held at any desired position along the length of 38 by use of a set screw 39.

In order to prevent more than one piston from falling through the holding leaves 32, 33 when they are in the open position, a piston stopping device, shown in Figs. 7 and 8, is attached to the rod-like extension 46 on the chute end of leaf 33. The holding arm, Fig. 7, 44, has two flanges 47 each with bolt holes on opposite sides of 44, best shown in Fig. 6. A short arm 49, made of flexible steel strips, and terminating in a thick rubber tip 50, is attached to 44 by a small metal plate 52 which has two bolt holes on 49. Two bolts are then inserted through the holes in 52 and 47, and tightened, drawing 49 tightly against the flat upper end of 44 and holding 49 firmly in place. This arrangement permits easy removal of broken or weak strips in 49, and also allows easy adjustment of flexibility by loosening the two bolts and adding or removing strips.

Fig. 2, 20 indicates how piston carrying units may be linked together by chain.

Function

Fig. 2 shows the continuous grooved track 29, which is suspended on metal arms, that serves as the wheel-rests for the piston carrying units. The track passes along the front of the machine as shown in Fig. 2, and thence around to the rear of the grinder. Elevation of the track is best shown in Fig. 1, the elevation in front of the machine being sufficient to allow gravity to cause the piston to slide down the chute to 26. In the rear of the machine, the track is lower than the return chute, causing the piston carrying unit to pass below the holding unit as shown in Fig. 1, at 31 and 3, lower right. The grinding machine is of any desired automatic type, and not concerned with this patent. Two rotating grinders grasp the inserted piston at the front of the machine and pass it through to the chute 30 in the rear.

The piston carrying unit, Figs. 3 and 4, functions as follows: The piston 1 is placed on holding leaves 32 and 33 as shown Fig. 4, and when wheel 10 is drawn across tripper 11, Fig. 3, trip rod 4 is pushed back, causing arms 5 to push open 3, releasing piston onto the pivoted 22 section 21 of chute 25, Fig. 1. The weight of the deposited piston forces 21 to tilt down sufficiently to allow the piston to slide into 25, where it comes into contact with two rotating belts on rotors 26. The belts force the piston against the piston immediately ahead on the chute, causing the waiting piston to be pushed into the grinders, and the last piston to take the waiting position. Having passed through the grinders, the piston passes into chute 30 where it is drawn by gravity down the chute, and slides onto the holding leaves, Fig. 5, 32a, 33a of the piston holding unit. The position of this unit is best shown in Fig. 1 and Fig. 2.

The empty piston carrying unit of the conveyor passes directly below the holding unit, Fig. 1, where the trip wheel, Fig. 3 and Fig. 4, 16 comes in contact with the trip rod, Fig. 5 and Fig. 6, 40. When 40 is pushed by 16, leaf 32 causes bar 43 to pull extension 34, causing both leaves to open simultaneously to release piston 1, which drops onto the rubber pads, Fig. 3, 55 ready for transfer from the conveyor system. As 33 is opened, the extension rod 46 to which the piston stopper, Fig. 7, is attached rotates a few degrees, causing the rubber tip 50 to be inserted into chute 30 as shown by dotted lines in Fig. 7, 51. This action will prevent another piston from falling onto the opened leaves 32, 33, by pressing against a waiting piston in chute 30, or if there is no piston at the end of 30 when the tripping action is begun, 51 will prevent any piston from sliding onto the leaves during tripping action. The coil spring 37 draws the leaves closed after they have been tripped, the closing action being terminated by the contact of 43 with 57 which acts as a stop.

Description of present method of grinding automobile pistons

Pistons to be ground are carried to the grinding machines on a conveyor which consists of a number of hooks suspended from an overhead track. The hooks are attached to rollers and pulled along by a chain, at a set speed to insure desired production.

The grinding machines are set up in rows; the conveyor passing close by the front of each machine. A workman stands in front of each machine, takes pistons off the large conveyor, places them on a small chute, and pushes them into the grinding machine with a long metal rod.

Once inside the grinder, the pistons are ground automatically, passed through the machine, ejected onto a wire chute which, with the help of a small belt-type conveyor, carries the finished piston around to the front of the grinder. The workman then picks up the finished piston, hangs it back up on the large hook-type conveyor, and the cycle is completed.

Workers also gauge a finished piston at approximately ten-minute intervals, adjusting machine if necessary.

From the foregoing it will now be seen that there is herein provided an improved conveyor for piston to and from a grinding machine, which accomplishes all of the objects of the above entitled invention and many others including many advantages of great practical utility and commercial importance.

As various embodiments may be made of this inventive concept, and as various modifications may be made in the embodiment hereinbefore shown and described, it is to be understood that all matter hereinbefore is to be interpreted merely as illustrative and not in a limiting sense.

What I claim is:

In a conveyor system for guiding pistons from a movable conveyor unit to a grinding machine and, after grinding to a holder receptacle, the combination of descending guides extending from one point of travel of said conveyor unit to said grinding machine, additional guide chutes extending from said grinding machine to said holding receptacle, means on each conveyor unit for holding a single piston to be ground, said means comprising arcuate leaves normally biased to piston holding position, trip means located adjacent said one point of travel of said conveyor unit for releasing said leaves to permit the piston held thereby to fall into the adjacent guide chutes, said receiving holder unit including a second pair of arcuate leaves normally biased to piston holding position, and trip means for releasing the piston held by said leaves upon juxtaposition of a conveyor unit to said holding mechanism.

References Cited in the file of this patent

UNITED STATES PATENTS

| | | |
|---|---|---|
| 898,179 | Brauer | Sept. 8, 1908 |
| 1,665,084 | Caster | Apr. 3, 1928 |
| 1,850,373 | Booth | Mar. 22, 1932 |
| 2,213,639 | Schellentrager | Sept. 3, 1940 |
| 2,472,707 | Jones | June 7, 1949 |

FOREIGN PATENTS

| | | |
|---|---|---|
| 369,168 | Germany | Feb. 15, 1923 |